United States Patent Office 3,198,759
Patented Aug. 3, 1965

3,198,759
ADDITION POLYMER COMPOSITIONS AND
METHODS OF PRODUCING THEM
Claude J. Schmidle, Moorestown, N.J., assignor to Rohm
& Haas Company, Philadelphia, Pa., a corporation of
Delaware
No Drawing. Filed Jan. 30, 1962, Ser. No. 169,957
4 Claims. (Cl. 260—22)

The present invention is concerned with addition polymer compositions that are particularly adapted for use as coating and impregnating compositions. It is particularly concerned with the production in a hydrocarbon medium of a dispersion of an addition polymer in the form of finely divided particles which are insoluble in the medium but dispersed therein in a condition of stability, especially against a mechanical action.

Known compositions for coating and impregnating purposes include solutions of addition polymers in organic solvents or water and aqueous latices. Organic solvent solutions generally contain a polymer of low molecular weight which tends to provide properties of brittleness and lack of durability of coatings obtained in comparison to the properties obtainable with higher molecular weight polymers. When the polymers to be used in such solutions are made of moderate molecular weight, the solutions become extremely viscous and are difficult to apply. When such solutions are applied at customary concentrations such as in spraying, the coatings are frequently so thin that it may be necessary to make more than two applications to provide adequate thickness. Solvent solutions often require expensive solvents such as esters, ketones, and hydrocarbons of essentially aromatic character, and such solvents are often severely toxic.

In many cases aqueous solutions are simply out of the question because the nature of the polymer, to be soluble in water, must necessarily impart water-sensitivity to the coated or impregnated product. Of course, aqueous solutions also necessitate the use of polymers of relatively low viscosity and the disadvantages pointed out hereinabove in conjunction with the application of high viscosity solutions of relatively lower concentration which produce coatings of inadequate thickness in a single pass.

Use of emulsion polymers or aqueous latices of the polymer enable the application of polymers of high molecular weight. However, they have the disadvantage that it is impossible to incorporate in the polymers various monomers which are reactive toward water such as maleic anhydride, itaconic anhydride, methacrylic anhydride and isocyanato-ethyl acrylate. Furthermore the water has a high latent heat of evaporation and hence more heat is required for drying. This factor may be of the order of ten times in aqueous systems, as compared to aliphatic hydrocarbon systems. The application of aqueous systems over umprimed wood also often brings about undesirable effects, such as raising the grain which in turn produces a non-uniform finish. Lightweight fibrous materials such as extremely thin tissue or paper cannot be impregnated with an aqueous system because of disintegration.

It is an object of the present invention to provide a dispersion of an addition polymer in the form of fine particles insoluble in an aliphatic hydrocarbon whereby the disadvantages of organic solvent solutions and aqueous compositions heretofore used for coating and impregnating purposes have been greatly reduced or completely overcome. Other objects and advantages of the invention will be apparent from the description thereof hereinafter.

In accordance with the present invention new and improved essentially non-aqueous or anhydrous compositions are produced by addition polymerizing at least one monoethylenically unsaturated monomer having a group

in a hydrocarbon medium consisting essentially of one or more aliphatic hydrocarbons containing dissolved therein a drying oil-modified linear polyester condensation product of at least one dicarboxylic acid selected from the group consisting of phthalic acid, isophthalic acid, terephthalic acid and saturated aliphatic dicarboxylic acids having 4 to 12 carbon atoms, with an aliphatic polyol having 2 to 6 carbon atoms, the amount of modified polyester being from 5 to 20% (preferably 10 to 15%) by weight of the total weight of polyester and monomer.

By the term "drying oil" it is intended to embrace semidrying oils as well as those generally considered to be full drying oils. The modified alkyd or polyester may be made from the several components in conventional fashion. The proportion of oil may be from 35 or 40% to as high as 80% or more based on the entire weight of alkyd or polyester. The long oil alkyds having a 45 to 80% drying oil content are preferred. The molecular weight of the alkyd may be from 1,000 to 5,000 and is preferably about 2,500 to 4,000.

Alkyd resins of the type herein contemplated are produced by the interaction of at least three materials; namely, a dibasic acid, a polyhydric alcohol, and a drying oil or semi-drying oil fatty acid or alcoholized drying or semi-drying oil. Other modifying agents may be present in the reaction mass such as, for example, monocarboxylic acids, e.g., benzoic acid, crotonic acid, etc. The alkyds may also be modified with rosin or phenolic resins, or other well known materials. Two principal techniques have been developed for the preparation of the oil-modified alkyds, e.g., solvent method and fusion method. For the present purposes, the manner of producing the modified alkyd is relatively unimportant. Accordingly, where reference is made to a drying oil or semi-drying oil-modified alkyd herein, alkyds are contemplated whether produced by (a) the direct esterification reaction of semi-drying oil fatty acids with the dicarboxylic acid and the polyhydric alcohol or (b) the indirect esterification wherein a drying oil or semi-drying oil is first alcoholized with a polyhydric alcohol and thereafter esterified with a dibasic acid, under either of the principal techniques mentioned.

It is, of course, understood that multiple components may be present in the reaction mass, and instead of one drying or semi-drying oil, a mixture of drying or semi-drying oils and/or fatty acids, one or more dibasic acids, and one or more polyols may be used. The reaction may be carried out in the presence or absence of catalysts and in the presence or absence of solvents.

The unsaturated aliphatic drying oil or semi-drying oil acids are preferably those derived from naturally occurring oils of animal, vegetable or marine origin, particularly those derived from drying oils and semi-drying oils. These acids may be either non-conjugated or conjugated and may be employed as the monomer, dimer and/or trimer. Such preferred acids have an iodine value of from about 120 to about 425. Specific examples of unsaturated aliphatic acids useful in accordance herewith for the production of oil-modified alkyd resins are as follows:

TABLE I

| Fatty Acid | Empirical Formula | Natural Source |
| --- | --- | --- |
| Hiragonic | $C_{16}H_{26}O_2$ | Japanese Sardine Oil. |
| Linoleic | $C_{18}H_{32}O_2$ | Cottonseed Oil. Soyabean Oil. Poppy Seed. Peanut Oil. Linseed Oil. Corn Oil. Perilla. Sunflower Seed. Sesame. |
| Iso-linoleic | $C_{18}H_{32}O_2$ | Castor Oil (dehydrated). Do. Linseed. |
| Linolenic | $C_{18}H_{30}O_2$ | Perilla. Hempseed. |
| Elaeostearic | $C_{18}H_{30}O_2$ | Tung. |
| Punicic | $C_{18}H_{30}O_2$ | Pomegranate. |
| Paranaric | $C_{18}H_{28}O_2$ | Seed Fats. |
| Arachidonic | $C_{20}H_{32}O_2$ | Brain, liver, blood and depot fats. |
| Clupanodonic | $C_{22}H_{34}O_2$ | Marine animal oils, e.g., menhaden. |
| Scoliodonic | $C_{24}H_{38}O_2$ | Marine animal oils. |
| Nisinic | $C_{24}H_{36}O_2$ | Do. |
| Tariric | $C_{18}H_{32}O_2$ | Seed Fat. |
| Licanic | $C_{18}H_{28}O_3$ | Oiticica oil. |
| Abaietic | $C_{20}H_{30}O_2$ | Rosin. Tall Oil. |

Natural oils of the drying or semi-drying types, as exemplified above, are generally mixtures of glycerides of two or more of the acids named together with other glycerides, e.g., glyceryl oleate, glyceryl stearate and miscellaneous ingredients, e.g., phosphatides. Procedures for producing mixed acids of such oils are well known, e.g., "splitting" and such commercial acids are a preferred starting material. Thus there may be employed dehydrated castor oil fatty acids; linseed oil fatty acids, soyabean oil fatty acids, tung oil fatty acids, rosin acids, tall oil acids, etc., the individual purified and segregated acids contained therein, or the fatty acids named above and synthesized by known methods. Also as indicated such acids may be isomerized, or converted to the dimer or trimer prior to use herein. Polyethenoic acids of the conjugated, non-conjugated, or mixed conjugated, non-conjugated types may be used. In the preparation of coating composition vehicles, the drying oil fatty acids, and particularly the vegetable drying oil fatty acids are preferred.

Another of the essential components of the alkyd resins used in this invention is a polyhydric alcohol. These are aliphatic polyhydroxy compounds containing two or more hydroxy radicals. Those which may be used in accordance with this invention include for example, ethylene glycol, diethylene glycol, propylene glycol, glycerine, trimethylolethane, trimethylolpropane, pentaerythritol, polypentaerythritol, pinacol, arabitol, xylitol, sorbitol, mannitol, mixtures of these, etc.

Under certain circumstances it will be found desirable to use in conjunction with the polyol or mixture of polyols, a monohydric alcohol. Examples of such monohydric alcohols include hydroabietyl alcohol, soya fatty alcohols, etc.

The third essential component of the alkyds useful in this invention is a dibasic acid. Specific examples of dibasic acids and/or derivatives of polybasic acids useful alone or in admixture with another polybasic acid in accordance with this invention include the following: phthalic acid, phthalic anhydride, isophthalic acid, terephthalic acid (preferably in admixture with another dibasic acid), adipic acid, sebacic acid, tetrahydrophthalic anhydride, tetrachlorophthalic anhydride.

The most commonly used dibasic acid is, of course, phthalic anhydride, alone or in admixture with one or more of the others listed above.

In accordance with well known production techniques, the alkyds useful in accordance with this invention are preferably prepared having an oil length of from about 50% to about 80%. In general, acid values of the final alkyds are maintained at less than about 40 and preferably less than 20. The excess of hydroxyl groups over the available carboxylic acid groups as calculated in the admixing of the ingredients may range up to 50% over that theoretically required to react with the carboxyl content of the reaction mass. It may seem difficult of reconciliation that these materials have an acid number and at the same time an excess of hydroxyl. This may be explained by the fact that esterification occurs during heating of these reactants at elevated temperatures and if heating is carried on too far, gelation ensues. The product becomes solid and useless. Therefore, the "cook" is discontinued usually prior to complete reaction of all the carboxyl groups with available hydroxyl groups. Thus the product has an acid value; at the same time it contains what may amount to an excess of hydroxyl.

In the examples given later in the specification, reference will be had to certain oil-modified alkyds in terms of the ingredients inter-reacted to produce them. It will be understood that customary alkyd formation techniques are employed and that the products have oil lengths, acid values and hydroxyl contents within the ranges above specified.

Among the wide variety of oil modified or oil-acid modified alkyds useful in accordance herewith are the following:

TABLE II (1) 52% linseed oil, pentaerythritol, phthalate
(2) 60% soya bean oil, pentaerythritol, phthalate
(3) 52% soya-tung, glyceryl phthalate-phenolic modified
(4) 39% linseed glyceryl phthalate alkyd
(5) 45% oil (1:1 linseed-oiticica) glyceryl phthalate alkyd
(6) 33% linseed glyceryl phthalate-rosin modified
(7) 72% linseed pentaerythritol isophthalate
(8) 80% linseed pentaerythritol isophthalate
(9) 70% dehydrated castor pentaerythritol phthalate
(10) 66% linseed pentaerythritol phthalate
(11) 52% oil (4:1 soya-dehydrated castor) pentaerythritol phthalate
(12) 52% linseed pentaerythritol phthalate-benzoate (7:1)
(13) 52% linseed pentaerythritol-trimethylolethane (1:1) phthalate
(14) 52% linseed trimethylolethane phthalate
(15) 75% linseed trimethylolethane terephthalate
(16) 40% soya trimethylolethane phthalate-fumarate (19:1)
(17) 60% linoleic acid glyceryl phthalate
(18) 70% linolenic acid glyceryl phthalate The percentages expressed above and in subsequent references to alkyd resins refer to the percentage of oil calculated as the glyceride in the final product at 100% solids. It does not matter whether the modification is by reaction of the oil fatty acid or the oil itself through alcoholysis; the designation will be the same.

Many other alkyds are known and may be used for this invention.

The monomers that can be used to produce the addition polymers of the present invention may be any monoethylenically unsaturated monomer which if used alone does not produce a polymer soluble in the hydrocarbon medium employed or if used with other monomers does not produce with the monomers used a copolymer soluble in such media. Preferred monomers include acrylonitrile and methacrylonitrile, acrylic acid, methacrylic acid, itaconic acid, and esters of these acids, especially of acrylic or methacrylic acids, with saturated alcohols having 1 to 4 carbon atoms, vinyl esters of acids having 1 to 3 carbon atoms, acrylamide, methacrylamide, vinyl chloride and vinylidene chloride. In general polymers and copolymers having any proportion of one or more of these several monomers produce polymers and copolymers which are adequately insoluble in the hydrocarbon solvent used.

Besides these monomers, a minor proportion (up to 45% by weight of the copolymer) of a vinyl aromatic compound such as styrene, vinyl toluene or vinyl naphthalene and similar proportions of higher saturated alcohol esters of acrylic acid or methacrylic acid or of higher aliphatic vinyl esters such as those of the acids having from 4 to 18 carbon atoms may be used. For example, esters of alcohols having from 5 to 18 carbon atoms with acrylic acid or methacrylic acid, or the higher alcohol vinyl esters mentioned which tend to impart hydrocarbon solubility to copolymers produced therefrom may be used in conjunction with other monomers to the extent that the resulting copolymer does not become soluble in the particular hydrocarbon medium employed. Usually the content of vinyl aromatic compound should not be over about 25% by weight and the content of higher alkyl acrylate or methacrylate esters should not be over about 30% by weight unless large proportions of other comonomers which counteract the solubilizing tendency of the higher esters or vinyl aromatic monomers are included, examples being acrylonitrile, vinyl chloride and methacrylic acid. The monomer mixture to be polymerized may also contain small proportions such as 0.5 to 10% by weight of maleic anhydride, isocyanatoethyl acrylate, N-methylolacrylamide, or N-methylolmethacrylamide.

The polymerization is effected in a hydrocarbon medium consisting essentially of liquid aliphatic hydrocarbons. A pure aliphatic hydrocarbon or a mixture of one or more may be employed. To the extent that any particular polymer produced is insoluble in the hydrocarbon medium resulting, the essentially aliphatic hydrocarbon may be modified by the incorporation of other solvent materials such as aromatic or naphthenic hydrocarbons and in certain instances the amount of such non-aliphatic component may attain as high as 49% by weight of the entire liquid medium. However, the liquid medium preferably consists essentially of aliphatic hydrocarbons and in general the compositions of the present invention contain less than 25% by weight based on the weight of the liquid medium of an aromatic hydrocarbon and often none at all.

It is essential that the hydrocarbon be of liquid character, but it may have a wide boiling range from a minimum of about −50° C. (in which case high pressures may be needed in the polymerization) to a maximum which may be as high as 520° C. For most purposes, the boiling point should be from about 75° C. up to about 200° C. The boiling point or boiling range of the liquid hydrocarbon system may be chosen as desired to be suitable for the particular operation in which the polymer dispersion prepared in the hydrocarbon is to be used. Thus, in coating or impregnating operations intended to be carried out in low temperature climates, a liquid hydrocarbon medium having a relatively low boiling point such as from about 30° to 35° C. may be preferred. A similar boiling point range may be selected for pressure systems, as in aerosol sprays. On the other hand, where the coating and impregnating operation is to be carried out in equipment provided with relatively high temperature drying ovens or rolls, the hydrocarbon system may have extremely high boiling points such as from 275° to 300° C. However, for most purposes, it is preferred to employ liquids boiling in the range from about 50° C. to about 235° C.

The term "consisting essentially of" as used in the definition of the ingredients present in the liquid medium claimed is intended to exclude the presence of other materials in such amounts as to interfere substantially with the properties and characteristics possessed by the composition set forth but to permit the presence of other materials in such amounts as not substantially to affect said properties and characteristics adversely.

The polyester is dissolved in the hydrocarbon medium in a concentration of at least 1%, generally from 5 to 60% or more, preferably about 40 to 60%, by weight. The entire amount of the hydrocarbon solvent that is to be present in the final composition may be used at the start, but generally it is preferred to use only a portion such as ½ to ¾ thereof and to dilute the product obtained. A free-radical initiator for the polymerization may be added to the solution of the alkyd in the hydrocarbon solvent or it may be added with the monomers. The polyester in the solution may be allowed to react with the initiator by allowing the mixture to stand at a temperature from room temperature to 125° C. for a period of several minutes to an hour or so before introducing the monomers. This apparently activates the polyester and causes it to react more extensively with the monomers. However, this activation step is not essential. The amount of initiator may be from 0.001% to 10% by weight based on the monomers, but it is preferably about 0.1 to 1% by weight on monomers. Any of the conventional free-radical initiators may be used provided they have appreciable solubility either in the hydrocarbon medium or in the monomers. Examples include the peroxides such as tert-butyl hydroperoxide, cumene hydroperoxide, and azo catalysts such as azodiisobutyronitrile.

The monomers may be added all at once to the alkyd solution or any portion thereof may be initially added and the remainder added gradually over a period of 1 to 5 hours or so. Depending upon the particular monomers, the particular inhibitor and the amount thereof, the polymerization may be allowed to proceed at room temperature in which case the heat that develops may be removed or not as desired. However, heating and/or cooling of the polymerization medium may be employed so as to provide for effecting the reaction at any controlled temperature from room temperature up to about 125° C. Generally with the peroxides as initiators the preferred temperature is in the range of about 70° to 100° C., whereas with the azo catalysts the preferred range is about 75° to 80° C.

As in conventional polymerization procedures, a so-called "chaser" solution of the initiator in the solvent may be added at the end of the reaction and allowed to cause additional polymerization during a period of 1 to 5 hours or so. Variations in the order of addition of monomers may be employed. In general the monomers may be mixed in the desired proportions before their addition to the polymerization medium comprising the solution of alkyd. However, it may be desirable to add one of the monomers first and then add a second or other monomers later. For example, a sluggish monomer such as vinylidene chloride may be added first, followed by a faster monomer such as ethyl acrylate. Similarly butyl acrylate may be followed by acrylonitrile. The addition of different monomers in succession may be resorted to for other reasons than merely to adjust for the different reactivity rates. It may be desired to polymerize one or more of the monomers initially and follow this with subsequent addition of one or more other monomers so that in effect a less homogeneous polymeric mixture is obtained.

The proportions of total monomer used are in the range of 80 to 95% by weight of the mixtures of the monomers and the polyester.

Essentially the product is a dispersion of a mixture of polymers comprising in major proportion an addition polymer of the monoethylenically unsaturated monomer or monomers in the form of undissolved particles of about 0.1 to 2 microns in size. The dispersion is moderately stable to mechanical forces such as centrifugation. It is presumed that the stability results from the fact that the polyester initially present or a copolymer of such polyester with a portion of the monomers provides an effective dispersing agent in the medium. The viscosity of the product at room temperature and 40% concentration in the hydrocarbon solvent in which it is produced ranges from 0.3 to 10 poises. In the preferred systems the viscosity is in the neighborhood of about 1 to 3 poises at 40% concentration and room temperature. The minimum film-forming temperature of the composition varies from about −40° C. to 150° C. depending upon the particular monomers and alkyds used.

It is believed that the product comprises a mixture of polymers including not only the polyester as initially introduced into the polymerization medium, but also polymers of the monomers with themselves and with each other and copolymers of the monomer or monomers with a portion of the polyester initially introduced. Such products are extremely difficult to analyze and the proportions of unchanged polyester, simple polymers or copolymers of the monomers, and copolymers of the polyester with one or more monomers depends upon the particular polyester, the extent of activation by catalyst before introduction of the monomers, and the particular monomers and conditions of polymerization.

In many cases, as much as 50% of the initially introduced amount of polyester remains as a component of the final composition. In other instances as little as 10% or as high as 90% of the polyester remains unchanged. However, the composition obtained is not the mere equivalent of a composition obtained by simply mixing the polyester initially used with a separately formed polymer or copolymer of the monomer or monomers used.

The stability of the dispersion depends apparently upon the formation in situ, during polymerization of the monomer or monomers in the presence of the polyester, of an appreciable polymeric component which serves as a dispersing agent in the composition. Such dispersing agent may be dissolved in the hydrocarbon medium partly or wholly or it may be partly or entirely adsorbed on the surface of the individual polymer particles held in suspension in the medium.

As compared to compositions containing a natural or synthetic rubber such as of the butadiene or isoprene types, the compositions of the present invention have the advantage that they have no tendency to color on overbaking or to discolor or become embrittled in the coated or impregnated articles as a result of oxidation or exposure to ultra-violet light during weathering. In addition, anhydrous polymer dispersion systems based on oxidatively degraded rubbers as dispersing agent precursors required extremely careful control of the extent of oxidation. The products of the present invention require no such special step for the production of products having reproducible viscosity and improved coating characteristics such as adhesion and freedom from discoloration.

The polymer dispersions of the present invention may have concentrations varying from 1 to 55% or higher solids content. The compositions are dilutable to any desired concentration for application for the coating and impregnation of various substrates as well as for the formation of free films by casting techniques. The polymer dispersions may be employed for the impregnation and coating of textile fabrics, paper, paperboards, leathers, wood, metals, ceramics, concrete, bricks, stones, plaster, vinyl wall tile and flooring tile, linoleum, asphalt tile, and asbestos cement products including siding and shingles.

The viscosity of the dispersion is easily controlled such as by the addition of an aliphatic hydrocarbon solvent which simply dilutes the dispersion or by the addition of a swelling agent for the polymer, or by the addition of hydrocarbon-soluble polymers, natural gums and resins, or lyophilic clays, such as the fatty amine quaternary salt-modified bentonites or montmorillonites, colloidal silica, and fatty acid-modified silicates.

The polymer dispersions of the present invention are adapted to be modified by the incorporation of drying oils, waxes (hydrocarbon, chlorinated hydrocarbon, and ester types), pigments, fillers, dyes, as well as plasticizers and polymeric or resinous materials which are soluble in the hydrocarbon liquid vehicle including fatty-acid modified shellac, gums, natural resins, waxes, asphalt, bitumen, coal tar, cumarone-indene resins, epoxidized fatty oils, epoxy resins, organic solvent-soluble alkylated methylolated aminoplast resins including the condensates of formaldehyde with urea, melamine, thiourea, benzoguanamine, ethyleneurea, alkylated with an alcohol having 2 to 6 carbon atoms such as n-butanol. Among other materials that can be incorporated are the alkyds, organic solvent-soluble vinyl and acrylic resins with or without plasticizers including plastisols obtained from polyvinyl chloride or copolymers of vinyl chloride and plasticizers therefor.

In the following examples which are illustrative of the present invention, the parts and percentages are by weight unless otherwise noted.

*Example A*

Into a 3-necked reactor equipped with a thermometer, mechanical stirrer and reflux condenser were charged 968 parts of soyabean oil, 100 parts of glycerol, 111 parts of pentaerythritol and 0.2 part of sodium methoxide. The reactor was closed and evacuated to 10 mm. Hg pressure and then repressurized with nitrogen to atmospheric pressure. The mixture was heated under a slow stream of nitrogen to 250° C. and held at 245 to 250° C. for about 1 hour or until the mixture became crystal clear. Then the mixture was cooled to 160° C. and 181.3 parts of phthalic anhydride and 247 parts of sebacic acid added. The temperature was raised to 230 to 235° C. and held there for 5 hours after 87 parts of water had been removed. The material was then cooled to room temperature.

*Example B*

Into a 3-necked reactor equipped with a thermometer, mechanical stirrer and reflux condenser were charged 1,380 parts of linseed fatty acids, 645 parts glycerine and 505 parts of phthalic anhydride, and 690 parts of sebacic acid. The reactor was closed and evacuated to 10 mm. Hg pressure and then repressurized with carbon dioxide to atmospheric pressure. The mixture was heated under a slow stream of carbon dioxide to 235 to 240° C. over about 2 hours and held at that temperature until the acid value fell below 10. The alkyd thus obtained was cooled to room temperature.

*Example C*

Into a 3-necked reactor equipped with a thermometer, mechanical stirrer and reflux condenser were placed 478 parts of dehydrated castor oil and then the reactor flushed with nitrogen. Stirring and heating were begun, and 50.2 parts of glycerol and 65.5 parts of trimethylolethane were added. When the temperature reached 125° C., 0.1 part of sodium methoxide was added. Heating was continued until the temperature reached 255° C. (about 3½ hours total) after which the mixture was heated at 250 to 255° C. until the mixture became crystal clear (about ½ hour). The mixture was then cooled to 160° C., and 247 parts of sebacic acid were added. The temperature was then raised to 230 to 235° C., and held there until the acid number fell to 12 (about 7 hours total). The material was cooled.

*Example D*

Into a 3-necked reactor equipped with a thermometer, mechanical stirrer and reflux condenser were charged 484 parts of alkali-refined safflower oil, 100.5 parts of glycerol and 0.2 part of sodium methoxide. The reactor was then thoroughly flushed with dry carbon dioxide.

The mixture was heated under a stream of carbon dioxide to 250° C. and held at 245 to 250° C. for about 1 hour when the mixture became clear. Then the material was cooled at 160° C. and 181.3 parts of phthalic anhydride were added. The temperature was then raised to 230 to 235° C. and held there until the acid number was 10 (about 5 hours total). The material was cooled.

*Example 1*

A solution of 240.0 parts of the alkyd resin, described in Example A, in 1,200 parts of mineral spirits (boiling over the range of 319 to 390° F.) was heated with agitation to 90° C. in a nitrogen atmosphere. A mixture of 48.0 parts glacial acrylic acid, 456 parts of methyl methacrylate and 456 parts of ethyl acrylate containing 1.6 parts of benzoyl peroxide was added gradually over a period of 3 hours to the alkyd solution at 90° C. Following this, 3.0 parts of lauroyl peroxide was added in six equal portions over an additional 3 hours. The resulting fluid dispersion was then heated an additional 30 minutes before cooling to room temperature. It had a milky appearance and a solids content of 48%, indicating an overall conversion of monomer to polymer of 95%. Dispersed but undissolved polymeric particles ranged in size from about 0.2 to 1.8 microns. The dispersion was coated and baked (at 300° F. for 30 minutes) on glass and metal producing clear and glossy films having good adhesion to the substrate.

*Example 2*

A solution of 60 parts of the resin described in Example C in 600 parts of commercial octane was heated to 80 to 85° C. in a nitrogen atmosphere with stirring. To this was added gradually over a period of 3 hours a mixture of 108.0 parts of acrylonitrile, 324 parts of ethyl acrylate and 108 parts of methyl methacrylate in which was dissolved 0.8 part of benzoyl peroxide. Then a solution of 3.2 parts of lauroyl peroxide in 300 parts of the same octane was added continuously over an additional 3 hours and heated 1 hour after the catalyst addition. On cooling to room temperature the finished dispersion had a milky appearance and a viscosity of 65 centipoises. It had a solids content of 38.7 percent and comprised dispersed, undissolved polymer particles of a size ranging from 0.1 to 2 microns. The dispersion was sprayed onto steel panels and dip-coated onto copper wire, partially dried and then baked for 10 seconds at 450° F., producing coatings which showed remarkable resistance to attack by water, alcohol, and aromatic solvents.

*Example 3*

To a solution of 90.0 parts of the alkyd resin, described in Example B, in 900 parts of aliphatic solvent naphtha (boiling range 244 to 291° F.) in a suitable reaction vessel were added 229 parts each of methyl methacrylate and ethyl acrylate, 51 parts of methacrylamide, 1.5 parts benzoyl peroxide and 3.0 parts lauroyl peroxide. The mixture was heated with stirring to 70° C. under a stream of dry nitrogen. After about 30 minutes, a vigorous reaction set in and it was necessary to apply cooling occasionally to avoid over-heating. The reaction mixture was stirred at 70° C. for a total of 3 hours. The finished milky dispersion contained 39.4% polymer solids (particle size of the undissolved, dispersed polymer ranging from 0.1 to 2 microns) and films thereof brushed onto steel, aluminum, glass or wood on drying formed clear, hard coatings which exhibited very good adhesion.

*Example 4*

A mixture of 600 parts mineral spirits (boiling range 319 to 390° F.), 30.0 parts of the alkyd resin described in Example D and 114.0 parts of isobutyl methacrylate were placed in a reaction vessel equipped with a mechanical stirrer and heated with stirring to 100° C. under a stream of dry nitrogen. Then a mixture of 57 parts of methyl methacrylate, 126 parts of ethyl acrylate and 0.8 part of benzoyl peroxide was added all at once to the mixture in the vessel. When the temperature reached 100° C. again (about 30 minutes), the addition of a mixture of 84 parts methyl methacrylate, 126 parts ethyl acrylate, 275 parts of the same mineral spirits and 1.2 parts of benzoyl peroxide was started. This mixture was added continuously to the polymerizing mixture at 100° C. over a period of 2.5 hours. Finally a solution of 4.0 parts of benzoyl peroxide in 25 parts of toluol was added dropwise to the mixture at 100° C. over an additional 3 hours.

After an additional heating period of 45 minutes, vacuum was gradually applied to the hot dispersion and solvent removed by distillation until the solids content had increased to 50%. On cooling to room temperature the milky fluid dispersion had a viscosity of 325 centipoises. It contained undissolved polymer particles ranging in size from 0.1 to 0.8 micron. Films of the dispersion on maple and yellow pine which were prepared by brushing one coat and air-drying 30 minutes followed by a second coat which was allowed to dry for 48 hours could not be scraped off without at least 50 percent wood failure.

*Example 5*

A solution of 10.0 parts of the alkyd resin described in Example D in 100 parts of aliphatic solvent naphtha (boiling in the range of 244 to 291° F.) and 50.0 parts of xylene together with 20.0 parts freshly distilled ethyl acrylate, 1.0 part glacial acrylic acid and 1.0 part lauroyl peroxide were charged with stirring into an autoclave. The atmosphere was displaced by dry nitrogen and the autoclave cooled to −50° C. Seventy parts of vinyl chloride gas (B.P. −14° C.) were condensed into the reactor and the vessel was then sealed and heated slowly over a period of 2 hours to 80° C. The pressure rose initially to 150 p.s.i. gauge and then gradually dropped off over the course of 6 hours at 80° C. to about 5 p.s.i. gauge. The autoclave was cooled to room temperature and vented. The resulting stable milky dispersion contained 37.5 percent solid polymer (undissolved dispersed particle size ranging from 0.3 to 1.2 microns) and yielded flexible films upon evaporation of the solvent medium.

*Example 6*

A solution of 240.0 parts of the alkyd resin described in Example B in 800 parts n-heptane and 400 parts Hi-Flash naptha (boiling range 293 to 365° F.) was placed in a polymerization vessel equipped with a mechanical stirrer and a reflux condenser and heated to reflux (96 to 98° C.) with stirring. During the heating to reflux a mixture of 250 parts ethyl acrylate, 115 parts styrene, 19 parts glacial acrylic acid and 2.0 parts of benzoyl peroxide was added. After one hour of heating at reflux, the addition of a mixture of 375 parts ethyl acrylate, 173 parts styrene, 26 parts glacial acrylic acid, 3.0 parts benzoyl peroxide and 575 parts n-heptane was started. The mixture was added gradually to the polymerization vessel over a period of 2 hours. After this a solution of 5.0 parts of benzoyl peroxide in 25 parts toluol was added in 12 equal increments over a period of 4 hours. After refluxing for an additional 1.5 hours, the dispersion was distilled at atmospheric pressure until the solids content had increased to 55 percent. On cooling to room temperature the resulting milky white dispersion had a faint bluish tint to it and had a viscosity of 312 centipoises. The particle size of the dispersed particles in the dispersion ranged from 0.1 to 0.4 micron. The material brushed onto wood (red cedar) very smoothly leaving no ridges to give on air-drying a semi-gloss finish which did not darken the color of the wood.

*Example 7*

A solution of 20 parts of the alkyld resin described in Example A in 300 parts of aliphatic hydrocarbon solvent naphtha (boiling in the range of 244 to 291° F.)

was mixed with 180 parts of vinyl acetate in a reaction vessel equipped with a mechanical stirrer and a reflux condenser. The mixture was heated to a reflux under a blanket of dry nitrogen and 0.4 part of α,α'-azodiisobutyronitrile added. The dispersion was refluxed for another 3 hours and cooled. The milky fluid dispersion which was obtained contained dispersed particles ranging in size from 0.1 to 1.7 micron and formed tough clear films when cast at 50° C.

*Example 8*

A mixture of 0.2 gram of benzoyl peroxide, 7 grams of a commercially available soyabean oil-modified pentaerythritol-phthalic anhydride alkyd resin dissolved in 3 grams of mineral thinner, and 175 grams of octane was refluxed for 45 minutes (95° C.). A mixture of 50 grams of methyl methacrylate and 50 grams of ethyl acrylate were added and the mixture was heated at 95° C. for 4 hours. A white polymer dispersion was obtained containing undissolved dispersed particles ranging in size from about 0.1 to 2 microns.

*Example 9*

A mixture of 50 grams of a commercially available dehydrated castor oil-modified phthalic anhydride glycerol alkyd, 0.2 gram of lauroyl peroxide and 100 grams of mineral spirits were stirred and heated at 100° C. for one hour in an atmosphere of nitrogen.

A mixture of 40 grams of ethyl acrylate, 40 grams of methyl methacrylate and 0.5 gram of acrylic acid and 0.15 gram of benzoyl peroxide was added over the course of one hour at 92° C. A solution of 40 grams of ethyl acrylate, 40 grams of methyl methacrylate, 0.5 gram of acrylic acid and 0.2 gram of benzoyl peroxide in 80 grams of an essentially aliphatic mineral thinner was then added over the course of 2 hours at 92° C. A viscous milky polymer dispersion was obtained containing dispersed undissolved particles ranging in size from 0.1 to 2 microns.

I claim:
1. A process for producing an addition polymer composition which comprises dissolving at a concentration of at least 1% in a liquid, essentially aliphatic hydrocarbon medium boiling in the range of 75° C. to 520° C. a drying oil-modified polyester condensation product of a dicarboxylic acid selected from the group consisting of saturated aliphatic dicarboxylic acids having 4 to 12 carbon atoms, phthalic acid, isophthalic acid, and terephthalic acid with an aliphatic polyhydric alcohol having 2 to 6 carbon atoms and 2 to 6 hydroxyl groups, and introducing into the solution at least one monoethylenically unsaturated monomer selected from the group consisting of acrylic acid, methacrylic acid, itaconic acid, acrylamide, methacrylamide, acrylonitrile, methacrylontrile, ($C_1$—$C_4$)-alkyl esters of acrylic acid, ($C_1$–$C_4$)-alkyl esters of methacrylic acid, vinyl formate, vinyl acetate, vinyl propionate, vinyl chloride and vinylidene chloride and a free-radical initiator at a temperature in the range of room temperature to about 125° C. to effect polymerization and to produce polymer particles stably dispersed in the medium which are undissolved in the medium and have sizes ranging from about 0.1 to 2 microns, the weight ratio of polyester to monomer being from 5:95 to 20:80, and the proportion of initiator being from 0.001 to 10% of the weight of the monomer.

2. An essentially anhydrous composition obtained by the process of claim 1.

3. A process as defined in claim 1 in which there is also introduced into the solution of the polyester at least one monomer selected from the group consisting of (1) styrene, vinyltoluene, vinyl esters of fatty acids having 4 to 18 carbon atoms, esters of acrylic acid with an alcohol having 5 to 18 carbon atoms, and esters of methacrylic acid with an alcohol having 5 to 18 carbon atoms, and (2) N-methylol-acrylamide, N-methylolmethacrylamide, and maleic anhydride, the amount of (1) when present not exceeding about 45% by weight of the total monomer weight, and the amount of (2) when present not exceeding about 10% by weight of the total monomer weight.

4. An essentially anhydrous composition obtained by the process of claim 3.

References Cited by the Examiner

UNITED STATES PATENTS

| | | | |
|---|---|---|---|
| 2,600,623 | 6/52 | Daniel et al. | 260—22 |
| 2,713,039 | 7/55 | Cadwell et al. | 260—22 |
| 2,727,870 | 12/55 | Beavers et al. | 260—22 |
| 2,990,384 | 6/61 | Schmutzler | 260—22 |
| 3,036,031 | 5/62 | Holland. | |

FOREIGN PATENTS

| | | |
|---|---|---|
| 541,423 | 5/57 | Canada. |
| 587,518 | 11/59 | Canada. |

LEON J. BERCOVITZ, *Primary Examiner.*

ALPHONSO D. SULLIVAN, *Examiner.*